United States Patent
von Seggern

(10) Patent No.: US 6,772,875 B2
(45) Date of Patent: Aug. 10, 2004

(54) CONVEYOR APPARATUS

(76) Inventor: Jorn von Seggern, Wildenlohslinie 36, 261 Bad Zwischenahn (DE)

( * ) Notice: Subject to any disclaimer, the term of this patent is extended or adjusted under 35 U.S.C. 154(b) by 0 days.

(21) Appl. No.: 09/982,584

(22) Filed: Oct. 17, 2001

(65) Prior Publication Data

US 2002/0056610 A1 May 16, 2002

(30) Foreign Application Priority Data

Oct. 18, 2000 (DE) .......................................... 100 51 655

(51) Int. Cl.⁷ ............................................. B65G 17/34
(52) U.S. Cl. ............................... 198/803.11; 198/459.7; 198/867.08
(58) Field of Search ........................... 198/867.08, 731, 198/867.11, 459.7, 419.1, 463.6, 803.11, 803.13, 803.1

(56) References Cited

U.S. PATENT DOCUMENTS

| | | | | |
|---|---|---|---|---|
| 2,358,292 A | * | 9/1944 | Malhiot | 198/803.13 |
| 3,779,364 A | * | 12/1973 | Kammann | 198/586 |
| 3,809,210 A | * | 5/1974 | Anderson | 198/803.1 |
| 4,893,707 A | * | 1/1990 | Langen et al. | 198/626.3 |
| 5,337,887 A | * | 8/1994 | Greenwell et al. | 198/473.1 |
| 5,560,473 A | | 10/1996 | Ivancso, Jr. et al. | |
| 5,586,642 A | * | 12/1996 | Hawkins | 198/803.1 |
| 5,806,659 A | * | 9/1998 | Middelberg et al. | 198/731 |
| 6,260,690 B1 | * | 7/2001 | Batzer | 198/484.1 |

FOREIGN PATENT DOCUMENTS

| | | |
|---|---|---|
| DE | 7023045 | 11/1971 |
| DE | 27 14 584 | 5/1978 |
| DE | 197 44 416 C1 | 4/1999 |
| DE | 199 15 271 A1 | 12/2000 |
| EP | 0 122 606 A2 | 12/1984 |

* cited by examiner

Primary Examiner—Richard Ridley
(74) Attorney, Agent, or Firm—Frommer Lawrence & Haug LLP; Leonard J. Santisi

(57) ABSTRACT

Conveyor apparatus for transporting objects, having a continuous circulating guided conveyor line with drivers arranged at intervals from each other, wherein the conveyor line is constructed of continuous circulating guided individual lines, each of which has drivers arranged at intervals from each other, and where the individual lines can be adjusted relative to each other in terms of their circulating positions, so that the intervals between the drivers of different individual lines can be adjusted simultaneously.

12 Claims, 4 Drawing Sheets

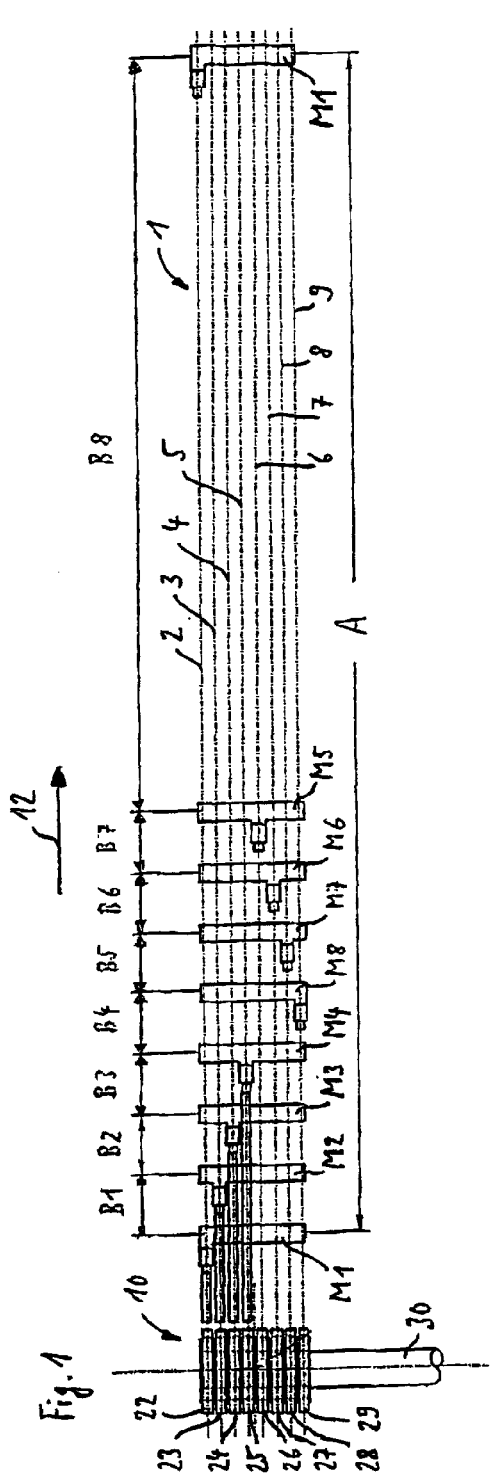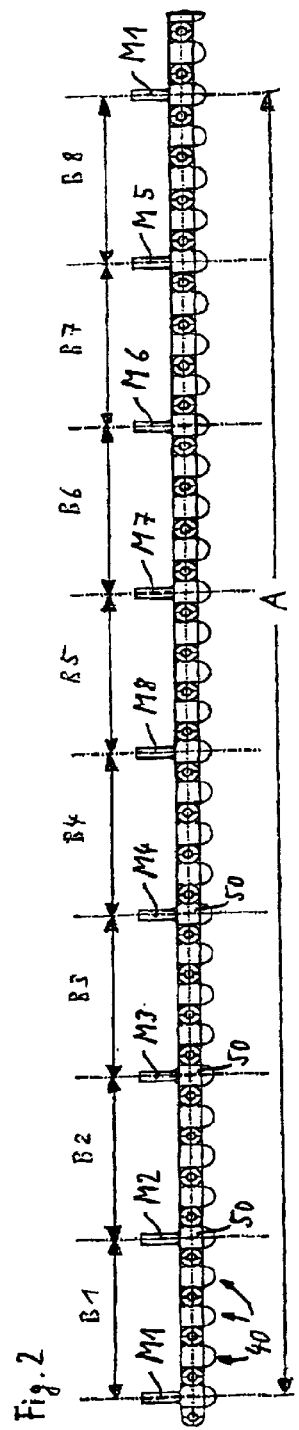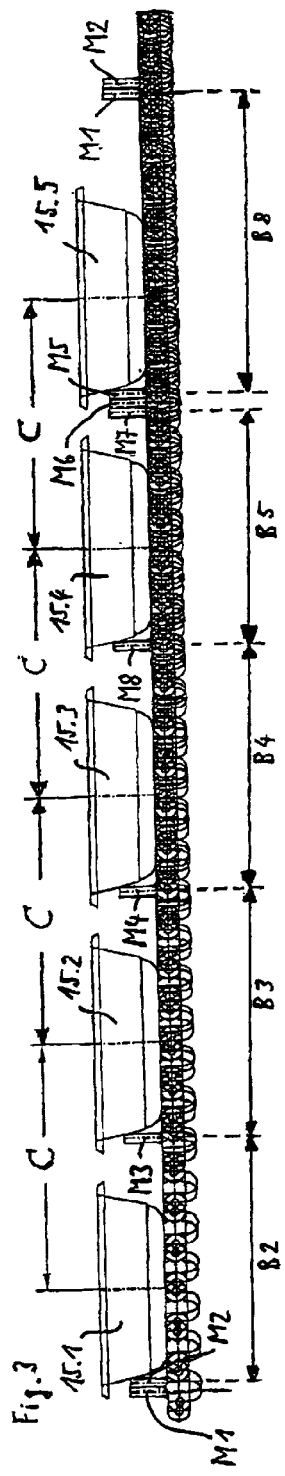

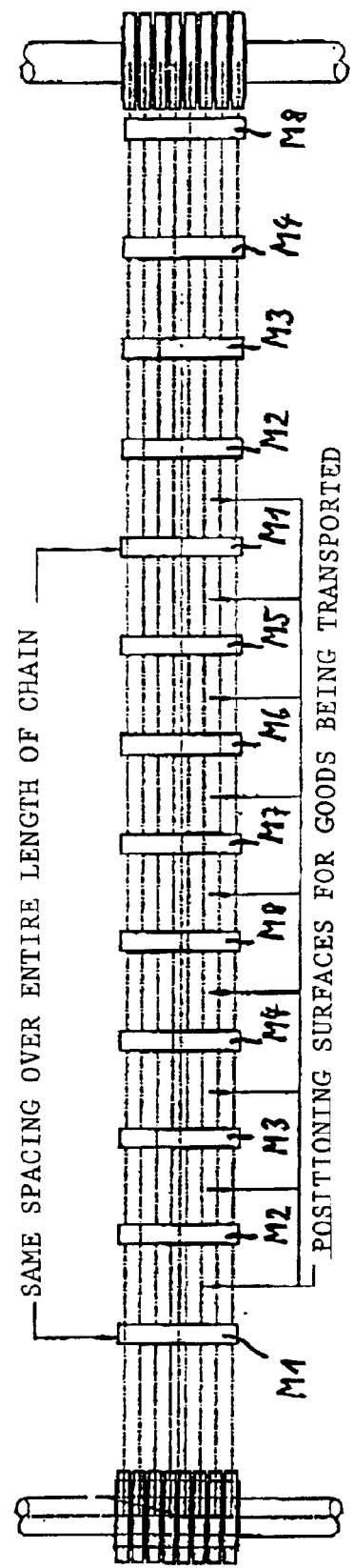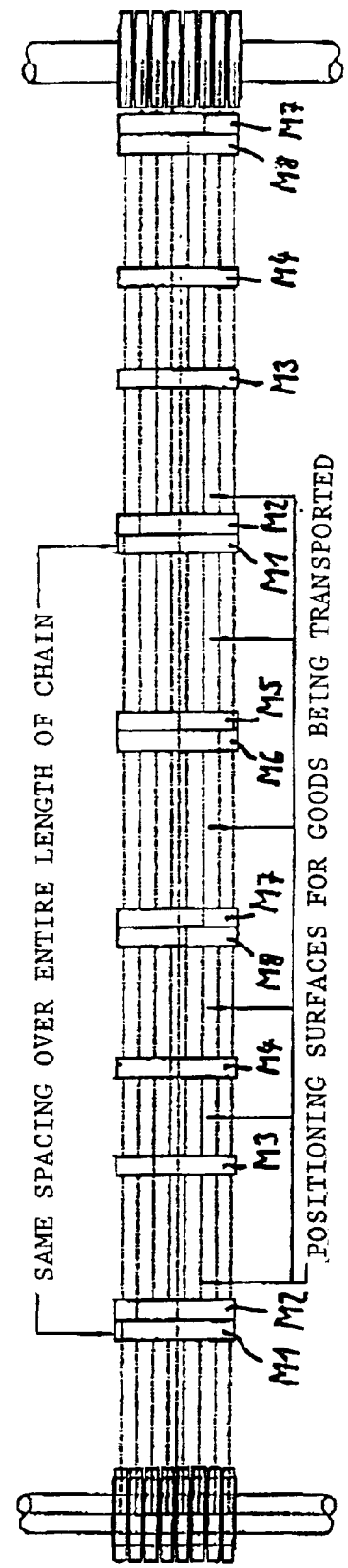
Fig. 4
Fig. 5

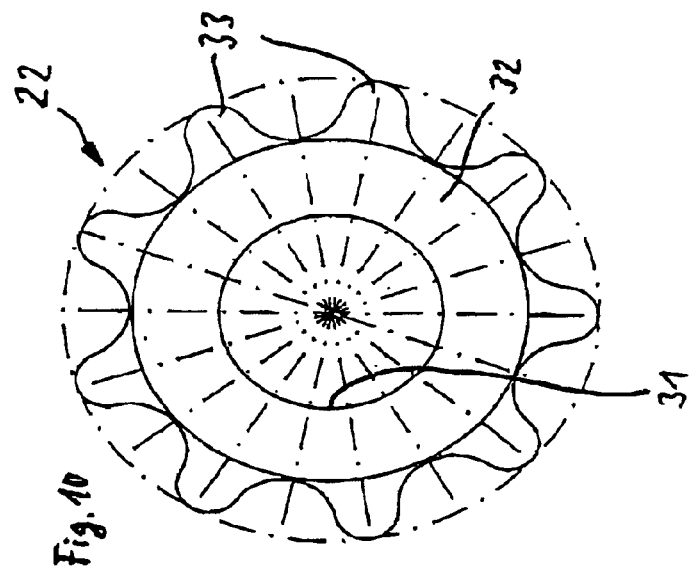
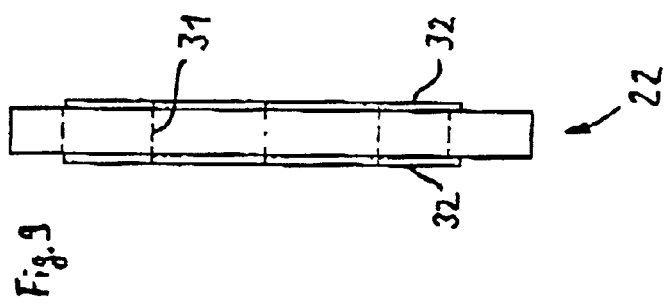
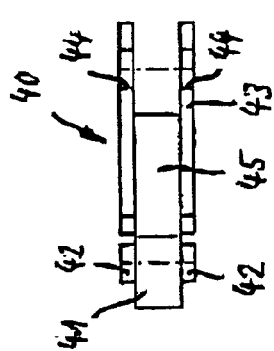
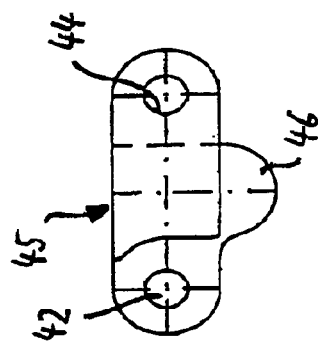
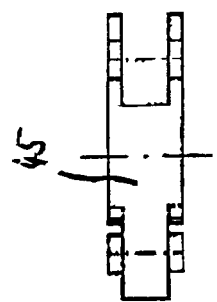

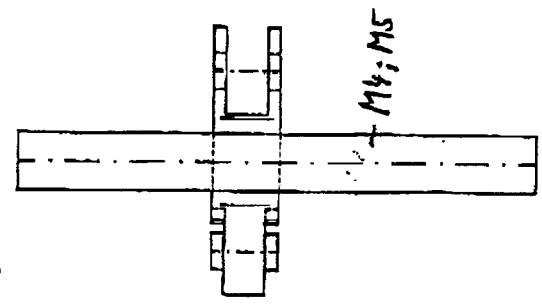
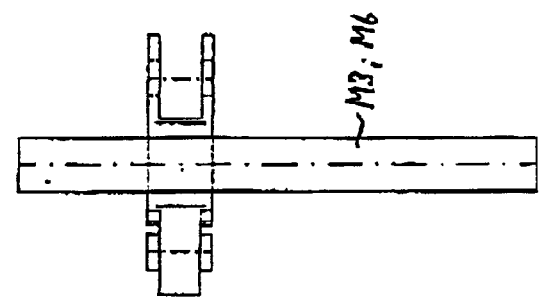
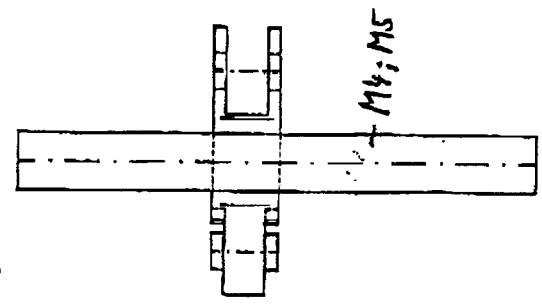
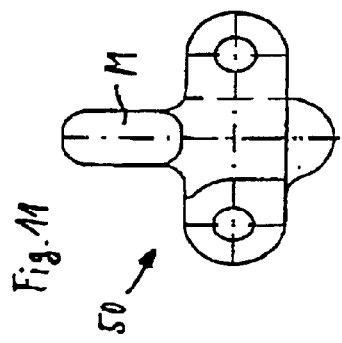
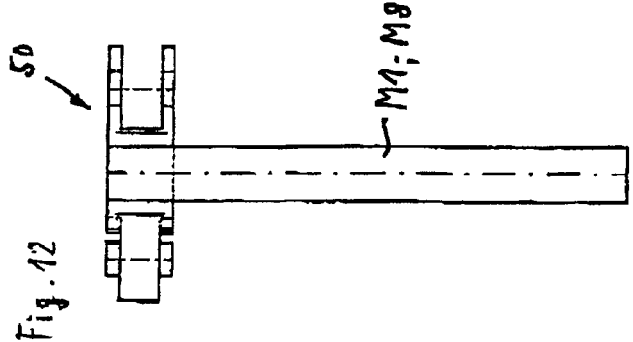

CONVEYOR APPARATUS

CROSS-REFERENCE TO RELATED APPLICATION

This application claims priority benefit to the German application Serial No. 10051655.6, filed Oct. 18, 2000.

BACKGROUND OF THE INVENTION

The invention pertains to a conveyor apparatus for transporting objects, having a continuous circulating guided conveyor line with drivers arranged at intervals.

Conveyor devices of this sort with drivers are used, for example, in the food industry, for sealing previously filled bowls, where the individual bowls must be fed to a sealing apparatus always at the same intervals. The sealing apparatus seals the bowls by groups, for example 4 bowls in each working cycle. The drivers ensure that the bowls will remain at a fixed distance from each other even if the conveyor line, for example a conveyor belt, is soiled and slippery from contact with the food which is being packaged.

Such conveyor devices have proven inherently successful in practice, but they have the disadvantage that a change in the interval between the drivers, such as is necessary for example when other sealing devices or other objects are used, involve a relatively great effort, in that the individual drivers have to be detached from the conveyor line and attached again at different positions.

BRIEF SUMMARY OF THE INVENTION

The task of the invention consists in improving a conveyor apparatus of this sort in such a way that the change in interval between the drivers can be carried out more easily.

This task is solved, in accordance with the invention, by means of a conveyor apparatus for transporting objects, having a continuous circulating guided conveyor line with drivers arranged at intervals. A distinguishing feature is that the conveyor line is made up of individual continuous circulating guided lines each having drivers arranged at intervals. With the individual lines adjustable relative to each other with respect to their circulating positions, the intervals between the drivers of different lines can be adjusted simultaneously.

Preferably, the individual lines are constituted of chains.

The design can call for the drivers on the individual lines to be held adjustably in the transport direction.

Preferably, the apparatus is designed so that the drivers of each individual line are arranged at fixed intervals from each other, especially uniform intervals.

Preferably, the drivers have driver strips which extend across all of the individual lines transversely to the transport direction.

The design can have an equal number of drivers arranged on each individual line.

In a preferred implementation form, provision is made for all of the individual lines to be guided over an adjusting roller made of guide wheels positioned side-by-side. These can be adjustable to different rotational positions relative to each other, each of which receives one individual line. At the same time, provision can be made for the guide wheels to be driven sprocket wheels. The guide wheels can be infinitely adjustable relative to each other, or can have stepwise detents. The adjusting roller can be designed as a guide roller and/or as a driving device.

Particularly for use in the field of food, provision can be made for the chains to be made entirely or partially of plastic. The chains can be made of interlocking links of one-piece design, each having a pin section with two cylindrical pins and a forked receptacle section with holes to receive the pins.

Each chain link can have a meshing projection which intermeshes positively with a drive wheel.

Preferably, the chain links have straight top edges or flat top sides, so that they form flat positioning surfaces for objects which are to be transported.

The design can call for the driver strips to be made in a single piece with a chain link.

BRIEF DESCRIPTION OF THE DRAWINGS

The invention is explained below on the basis of an implementation example with reference to a drawing in which:

FIG. 1 shows a schematic top view of a first implementation form of a conveyor apparatus in accordance with the invention, where the individual lines are in a particular configuration;

FIG. 2 shows a side view of a section of the conveyor line of a conveyor apparatus in accordance with the invention, where the individual lines are in a different configuration;

FIG. 3 shows a side view corresponding to FIG. 2, where the individual lines are in yet another different configuration, and objects (bowls) which are to be transported are shown on the conveyor line;

FIGS. 4 and 5 show schematic top views of a conveyor apparatus in accordance with the invention, showing different configurations of the individual lines;

FIG. 6 shows a top view of one chain link of an individual line;

FIG. 7 shows a side view of the chain link from FIG. 6;

FIG. 8 shows a view of the chain link from FIGS. 6 and 7 from below;

FIG. 9 shows a side view of a sprocket wheel;

FIG. 10 shows a top view of the sprocket wheel from FIG. 9;

FIG. 11 shows a side view of a chain link with a driver;

FIGS. 12 to 15 show top views of chain links which have drivers, with the driver positioned in different locations on the link.

DETAILED DESCRIPTION OF THE INVENTION

To explain the basic functioning of a conveyor apparatus in accordance with the invention, we shall refer initially to FIGS. 1 to 5. FIG. 1 is a schematic top view showing essential elements of a conveyor apparatus, namely a conveyor line 1 which is made up of several individual lines, in the illustrated example eight individual lines 2 to 9, and an adjusting roller 10 over which the conveyor line 1 runs. In the present example the individual lines 2 to 9, laid out in parallel, consist of chains; but they could consist alternatively of any flexible non-stretch material—for example straps, belts, toothed belts or steel cables. Drivers M1 to M8 are positioned on the individual lines at certain prescribed intervals A. Each driver is designed as a driver strip reaching transversely across all of the individual lines and is affixed to one individual line in a suitable manner. The arrangement is such that in the direction of transport (arrow 12) a driver M1 of the individual line 2 is followed by a driver M2 of the individual line 3. In sequence driver M2 is followed by a driver M3 of the individual line 4, followed by a driver M4 of the individual line 5, followed by a driver M8 of the individual line 9, followed by a driver M7 of the individual line 8, followed by a driver M6 of the individual line 7, followed finally by a driver M5 of the individual line 6. The driver which follows the driver M5 is again a driver M1 of the individual line 2. The arrangement repeats itself as all of the drivers M1 to M8 are arranged on the individual lines at prescribed intervals A.

The adjusting roller 10 is made up of a number of sprocket wheels or chain disks 22 to 29 corresponding to the number of individual lines. Each individual line passes over each sprocket wheel and intermeshes positively with it. These sprocket wheels in turn are mounted on a shaft 30. In the example shown the shaft 30 is driven, and the sprocket wheels 22 to 29 are connected to the shaft 30 and are locked together by a coupling mechanism (not shown) so that they rotate together. In the uncoupled state, each individual sprocket wheel can rotate relative to the others and to the shaft 30. Because of the positive-fit intermeshing of the individual lines 2 to 9 and the sprocket wheels 22 to 29 each individual line can be adjusted in the direction of circulation (i.e. in or contrary to the direction of transport 12). After an adjustment has been made and the sprocket wheels are again locked in a non-rotating connection to the shaft 30, the configured setting (mutually relative position) of the individual drivers of conveyor line 1 is unchangeable for the further operation of the conveyor apparatus.

FIG. 1 shows an arrangement of the drivers M1 to M8 in which the intervals between the drivers M1 and M2 are designated with B1, the intervals between the drivers M2 and M3 with B2, the intervals between the drivers M3 and M4 with B3, the intervals between the drivers M4 and M8 with B4, the intervals between the drivers M8 and M7 with B5, the intervals between the drivers M7 and M6 with B6, the intervals between the drivers M6 and M5 with B7, and the intervals between the drivers M5 and M1 with B8. The drivers M2 to M8 are spaced at a relatively small distance from each other and a small distance from the driver M1, so that the remaining interval B8 is relatively large. With such an arrangement, seven relatively small objects could be received within the relatively small intervals B1 to B7, while a relatively large object (or several small ones) could be received between the drivers M5 and M1. The depicted arrangement M1, M2 ... M1 is repeated periodically over the length of the conveyor line 1.

FIG. 2 shows a different configuration of the individual line arrangement in accordance with FIG. 1, where the individual lines 3 to 9 with the drivers M2 to M8 have been repositioned relative to the individual line 2 so that equal distances B1 to B8 between all of the drivers result. An arrangement of this sort is appropriate for receiving eight objects of equal size.

FIG. 3 is a view similar to FIG. 2, showing a configuration for receiving five bowls 15.1 to 15.5 of equal size. As FIG. 3 shows, the individual line 3 is shifted in such a way that its drivers M2 are in direct contact with the drivers M1. Between the drivers M2 and M3 of the individual lines 3 and 4 an interval B2 is set, between the drivers M3 and M4 of the individual lines 4 and 5 a like interval B3, between the drivers M4 and M8 of the individual lines 5 and 9 a like interval B4, and between the drivers M8 and M7 of the individual lines 9 and 8 again a like interval B5. The individual lines 7 and 6 are adjusted so that their drivers M6 and M5 lie close together and against the drivers M7 of the individual line 8, resulting in a remaining interval B8 between the drivers M5 and M1.

FIGS. 4 and 5 again illustrate the possibilities for variation on the basis of two different configurations. FIG. 4 shows a top view with equal intervals between all of the drivers, so that positioning surfaces of equal length are formed for objects which are to be transported. The number of positioning surfaces between two consecutive drivers of an individual line corresponds in this case to the number of individual lines, i.e. eight. FIG. 5 shows a different arrangement, where the individual lines have been adjusted in such a way that the pairs of drivers M1 and M2, M8 and M7, and M6 and M5 are in contact with each other. That results in three fewer positioning surfaces between two consecutive drivers of an individual line than in FIG. 4, i.e. five positioning surfaces, which in addition are set at different lengths in the example shown. The partitioning of a conveyor line into individual lines which can be adjusted relative to each other, with fixed drivers, thus makes it possible to form positioning surfaces in groups, with the group repeating itself regularly at the interval of the drivers on an individual line. A group of this sort with positioning surfaces is indicated in FIGS. 1 and 2 with the lengths B1 to B8, in FIG. 3 with the lengths B2 to B5 and B8, and results in a similar manner in FIGS. 4 and 5 from the positioning surfaces between two drivers of the same individual line, for example between two drivers M1, two drivers M2, etc.

As can be seen in particular from FIG. 3, the individual drivers M1 to M8 act in this case act as pushers; that is, an object which is to be transported, for example a bowl, is not fixed in position by two drivers (one in front of it and one behind relative to the direction of transport), but is merely pushed by one driver. Since there are a total of eight individual lines and thus eight drivers per group, it is possible within the framework of the total length A available for each group (FIGS. 1 and 2) to freely set the number and relative interval C (FIG. 3) of the individual objects within a group.

On the other hand, if a special implementation is desired in which the objects to be transported are clearly fixed spatially by drivers placed one ahead of and one behind the object relative to the direction of transport, for example when the objects are subjected to relatively strong acceleration (pulse operation), then (at least) twice as many individual lines (or independently adjustable drivers per group) must be present as the number of objects in each intended group. That is, for groups of two objects there must be four individual lines, for a group size of three objects there must be six individual lines, etc. With a design of this sort in accordance with the invention, which has the task of receiving groups of objects consisting of at least two objects, and adjustable in terms of the size of the objects and their relative spacing, the number of individual lines or of drivers per group is four, six or a larger multiple of two, with pushing drivers and those which lie ahead of the respective object in the direction of travel being placed alternately.

To further illustrate this situation let us refer once again to FIG. 3, which depicts an exemplary arrangement of the eight drivers for transporting five individual objects per group. Here individual drivers (M1, M2; M5, M6, M7) are slid closely together, since only five objects are present in each group. Alternatively, with the eight individual drivers up to eight objects per group can be transported, if all of the drivers are employed as pushers (only one driver per object, placed at the back end of the object as seen in the direction of transport). Alternatively, if individual ones or all of the objects of the group are to be "fixed" with two drivers each, this results in a correspondingly smaller number of objects per group: in the present example four, if all of the objects are transported with their position fixed by two drivers each.

Because all of the drivers of the individual lines are adjustable simultaneously, independently of each other, the invention makes it possible to set and modify such groups quickly along the entire length of the conveyor line.

Although the preferred design is for the drivers on all of the individual lines to be spaced at the same intervals, this is not absolutely required. For example, one or more individual lines could have irregularly spaced drivers or smaller intervals between drivers, if this is useful in certain applications.

As can be seen from FIGS. 2 and 3, the individual lines, in the sample implementation shown there, are made of chains, whose link 40 are illustrated in FIGS. 6 to 8 in various views. The link 40 are made in one piece of plastic, which represents a significant advantage especially in the area of foodstuffs in terms of hygiene and cleaning, and have a pin section 41 with two cylindrical pins 42 and a forked receptacle section 43 with two holes 44 to receive the pins. The links can be joined and separated without a tool, and in addition have no moving parts. A top side 45 of the chain link 40 is flat, so that flat positioning surfaces are formed for the objects to be transported, while on an opposing bottom side there are meshing projections 46 which intermesh with a positive fit with the chain sprockets 22 to 29.

FIGS. 9 and 10 show an exemplary illustration of a sprocket wheel 22 which has in internal bore 31 so that it can be placed on the shaft 30. Rounded-off teeth 33 intermesh positively with the drive projections 46 of the chain link 40 Optionally rotationally-locked or released connection of the sprocket wheels 22 to 29 with the shaft 30 can be achieved for example by pressing the cluster of sprocket wheels together in the axial direction, so that the individual sprocket wheels are frictionally connected with each other by frictional contact of their rubbing flanks 32 and are connected non-rotationally to the shaft 30 by means of a clamping or tensioning device (not shown) which is connected non-rotation-ally to the shaft 30.

FIG. 11 is a side view corresponding to FIG. 7, showing a chain link 50 which has a driver M; this can be one of the drivers M1 to M8 which are visible in FIGS. 2 and 3 on the chain link 40. It is practical for a conveyor apparatus with eight individual lines to have only four different links with drivers, as shown in top view in FIGS. 12 to 15. The chain link 50, which is made in one piece with the driver M, corresponds in other respects to the version in accordance with FIGS. 6 to 8 and is of course compatible with it, so that an individual line shown in FIGS. 1 to 5 can be made with it. FIG. 12 shows an arrangement of the driver which corresponds to the driver M1 or M8 in FIGS. 1 to 5, where the chain link 50 obviously merely needs to be rotated by 180° in order to be suitable for the individual line 2 or 9. The same is true of the links in FIG. 13 (suitable for conveyor lines 3 or 8), in FIG. 14 (suitable for conveyor lines 4 or 7) and FIG. 15 (suitable for conveyor lines 5 and 6). The desired intervals between the individual drivers of a single line (the length of a "group" of positioning locations on the conveyor line 1), which are designated with "A" in FIGS. 1 and 2, is obtained by inserting a suitable number of chain links 40 which have no drivers between each pair of chain links 50 which have drivers. With an arrangement of this sort, the intervals can be changed in steps which correspond to the length of a chain link 40.

What is claimed is:

1. A conveyor apparatus for transporting objects having a plurality of continuously circulating guided conveyor lines each of which has respective drivers arranged at intervals from each other wherein each conveyor line is constructed of continuously circulating individual chains and wherein the individual chains can be adjusted relative to each other so that the intervals between the drivers of different individual chains may be adjusted simultaneously and wherein each individual chain is guided over a sprocketed wheel with the sprocketed wheels being mounted adjacent to each other on a shaft in a cluster and a coupling mechanism to selectively couple said sprocketed wheels so that when coupled said sprocketed wheels rotate together said sprocketed wheels being connected fixedly and non-rotationally to the shaft so that in an uncoupled state each individual sprocketed wheel can rotate relative to the others and to the shaft.

2. A conveyor apparatus in accordance with claim 1 wherein said driven are held on each conveyor live so that they can be adjusted in the direction of transport.

3. A conveyor apparatus in accordance with claim 1 wherein each driver has driver strips which extend across all of the conveyor lines transversely to the direction of transport.

4. A conveyor apparatus in accordance with claim 1 wherein the same number of drivers are arranged on each conveyor.

5. A conveyor apparatus in accordance with claim 1 wherein each sprocketed wheel is adjusted continuously relative to another guide wheel.

6. A conveyor apparatus in accordance with claim 1 wherein each said sprocketed wheel is a driving device.

7. A conveyor apparatus in accordance with claim 1 wherein the chains are made at least partially of plastic.

8. A conveyor apparatus in accordance with claim 1 wherein each chain consists of links that can be locked together with each having a pin section with two cylindrical pins and a forked receptacle section with holes to receive the pins.

9. A conveyor apparatus in accordance with claim 1 wherein each chain link has straight top edges or flat top sides so that flat positioning surfaces are formed for objects which are to be transported.

10. A conveyor apparatus in accordance with claim 8 wherein each driver has strips that extend across all of the conveyor lines and said driver strips are made in a single piece with a selected one of said chain links.

11. A conveyor apparatus in accordance with claim 8 wherein each chain link has a meshing projection that intermeshes with a guide wheel or drive wheel.

12. A conveyor apparatus in accordance with claim 8 wherein each chain link has straight top edges or flat sides so that the flat positioning surfaces are formed for objects which are to be transported.

* * * * *